(12) United States Patent
Kato et al.

(10) Patent No.: US 8,229,613 B2
(45) Date of Patent: Jul. 24, 2012

(54) TRAVEL ENERGY LEARNING DEVICE, METHOD, AND PROGRAM

(75) Inventors: Kazuya Kato, Anjo (JP); Tatsuya Hidaka, Anjo (JP)

(73) Assignee: Aisin AW Co., Ltd. (JP)

( * ) Notice: Subject to any disclaimer, the term of this patent is extended or adjusted under 35 U.S.C. 154(b) by 427 days.

(21) Appl. No.: 12/603,609

(22) Filed: Oct. 22, 2009

(65) Prior Publication Data

US 2010/0121514 A1   May 13, 2010

(30) Foreign Application Priority Data

Nov. 7, 2008   (JP) .................................. 2008-287211

(51) Int. Cl.
   *B60L 9/00*   (2006.01)
(52) U.S. Cl. ......... 701/22; 701/32.5; 701/34.2; 701/400
(58) Field of Classification Search .................... 701/22, 701/32.5, 34.2, 400
   See application file for complete search history.

(56) References Cited

U.S. PATENT DOCUMENTS

| | | | |
|---|---|---|---|
| 5,650,931 A | 7/1997 | Nii | |
| 6,314,347 B1 | 11/2001 | Kuroda et al. | 701/22 |
| 6,480,767 B2 * | 11/2002 | Yamaguchi et al. | 701/22 |
| 2002/0062183 A1 * | 5/2002 | Yamaguchi et al. | 701/22 |
| 2007/0010933 A1 | 1/2007 | Hochkirchen et al. | |
| 2007/0112475 A1 * | 5/2007 | Koebler et al. | 701/1 |
| 2007/0213891 A1 | 9/2007 | Musser | |
| 2008/0119982 A1 | 5/2008 | Yamada | |

OTHER PUBLICATIONS

European Search Report corresponding to EP 09 01 2924 dated Apr. 19, 2011.

* cited by examiner

*Primary Examiner* — Hussein A. Elchanti
(74) *Attorney, Agent, or Firm* — Bacon & Thomas, PLLC

(57) ABSTRACT

A travel energy learning device includes: a road section identifying unit that identifies a road section where a host vehicle is currently located; a travel condition information obtaining unit that obtains travel condition information that indicates a travel condition when the host vehicle traveled the road section; a work rate deriving unit that derives information indicating work rate of a transmission shaft based on rate of rotation of the transmission shaft and torque transmitted by the transmission shaft; and an energy information accumulating unit that derives required energy information indicating the energy required for traveling the road section based on the derived information that indicates the work rate during travel of the road section, links the derived required energy information to the road section and the travel condition information, and accumulates the required energy information.

17 Claims, 8 Drawing Sheets

TRAVEL ENERGY LEARNING DEVICE, METHOD, AND PROGRAM

INCORPORATION BY REFERENCE

The disclosure of Japanese Patent Application No. 2008-287211 filed on Nov. 7, 2008 including the specification, drawings and abstract is incorporated herein by reference in its entirety.

BACKGROUND OF THE INVENTION

The present invention relates to a travel energy learning device, method, and program for a vehicle provided with a rechargeable battery.

DESCRIPTION OF THE RELATED ART

Conventionally, a usage schedule for an engine and a motor in a hybrid vehicle is set such that the amount of fuel consumed during travel on a route to a destination is minimized. Japanese Patent Application Publication No. JP-A-2000-333305 describes that, based on a driving history of a driver, road information specifying a route, vehicle information, and the like, an output energy value required to travel the route is calculated.

SUMMARY OF THE INVENTION

According to JP-A-2000-333305, the required output energy value is calculated based on the travel speed pattern stored as a driving history (and expressed as an average vehicle speed and average acceleration and deceleration in a section) and other information (such as rolling resistance, air resistance, acceleration resistance, and grade resistance). The accuracy of the required output energy value is dependent on the precision of the average vehicle speed, acceleration, deceleration, air density, road friction coefficient, gradient, etc., used in the calculation. However, it is difficult to obtain precise and accurate parameters that are used in the calculation, and the calculation is complicated due to the many parameters involved. Differences in the travel conditions of the host vehicle, such as weather conditions, the number of occupants riding in the host vehicle, and the driving state of the electrical component in the host vehicle, may mean that a different amount of energy will be required for traveling a road section even if the travel speed pattern is the same. It is thus difficult for the related art to accurately derive the energy required for traveling a road section.

The present invention was devised in light of the foregoing problem, and the present invention provides art for accurately deriving the energy required for traveling a road section.

To achieve the above, the present invention identifies a road section where the host vehicle is currently located and obtains travel condition information that indicates a travel condition when the host vehicle traveled the road section. The present invention also derives information that indicates a work rate of a transmission shaft based on a revolution of the transmission shaft that transmits a driving force from a drive source of the host vehicle to a wheel and torque transmitted by the transmission shaft, and identifies information that indicates the energy required for traveling the road section based on the information that indicates the work rate. The information indicating the required energy is linked to the road section and the travel condition information, and the linked information is accumulated. In other words, the revolution and torque of the transmission shaft are directly obtained from the transmission shaft, and the actual output work rate of the transmission shaft is derived from the revolutions and transmitted torque. In addition, the work rate of the transmission shaft is then used to derive the output energy required by the host vehicle to travel through a particular road section, and the output energy is linked to the travel condition information. Therefore, the output energy required for traveling the road section can be determined per travel condition, and the output value (the energy required to travel through the road section) may be derived more accurately using a simple calculation compared to a configuration that calculates the required output energy value using a travel speed pattern, road grade, road friction coefficient, vehicle weight, air resistance, or the like, regardless of the travel condition.

The road section identifying unit is not particularly limited provided that it is capable of identifying a road section in which the host vehicle is currently located. The road section serves as a unit to calculate the required output energy value in an energy information accumulating unit described later, and may be predetermined in embodiments of the present invention. The road section may include road sections that are divided by nodes, shape interpolating points, grade changes, and the like in map information, or road sections partitioned at arbitrary distance intervals, or a combination thereof. Any suitably determined road section may be used, provided that a start point and an end point, as well as a road therebetween may be uniquely identified. The current position of the host vehicle may be determined via GPS, various onboard sensors, map information, and the like, and the road section in which the host vehicle is currently located may be determined using the information that specifies the partitioning of road sections.

The travel condition information may comprise various information, provided that a travel condition information obtaining unit can obtain information that indicates a travel condition influencing the energy required by the host vehicle for traveling the road section as the travel condition information. For example, the travel condition information may comprise information that directly or indirectly indicates one or a combination of the following: a weight of the host vehicle when traveling the road section, a usage status of an electrical component in the host vehicle when traveling the road section, and a weather condition when the host vehicle travels the road section.

In other words, if the host vehicle's weight differs when traveling the road section, the energy required for driving the host vehicle also differs. Therefore, linking the host vehicle's weight and information indicating the energy required for traveling the road section enables a more accurate determination of the energy required for traveling the road section. Additionally, if the usage state of the electrical component in the host vehicle differs when traveling the road section, the electric power supplied from the rechargeable battery to the electrical component also differs. Therefore, linking the usage state of the electrical component and information indicating the energy required for traveling the road section enables a more accurate determination of the energy required for traveling the road section. Furthermore, if the weather condition differs when the host vehicle travels the road section, the energy required for driving the host vehicle also fluctuates due to differences in the friction coefficient of the road surface and the like. Therefore, linking the weather condition and information indicating the energy required for traveling the road section enables a more accurate determination of the energy required for traveling the road section.

Examples of information that directly indicate the travel condition include a weight value of the host vehicle, an electric power consumption value of the electrical component, rainfall, or the like. Examples of information that indirectly indicate the travel condition include information that indicates a category for classifying the travel condition. More specifically, the travel condition may be classified in advance using a plurality of categories. In this case, the travel condition is determined as belonging to any one of the categories, and the travel condition is linked to that category such that the travel condition information comprises information indicating the category.

For example, the host vehicle's weight may be classified into a plurality of categories depending on size, and the weight of the host vehicle when traveling the road section obtained. The category to which the obtained weight belongs may then be determined, and the identified category set as the traveling condition information. The electric power consumption of the electrical component may also be classified into a plurality of categories depending on magnitude, and the category to which the electric power consumption for the usage state of the electrical component when the host vehicle traveled the road section belongs then determined. Furthermore, the weather condition may also be classified into a plurality of categories, and the category to which the weather condition when the host vehicle traveled the road section belongs then determined. As explained above, by determining the appropriate category and using information that indicates the category as the travel condition information, the weight of the host vehicle, which is continuously variable, can be easily determined, and the travel condition information defined in a simple manner.

The work rate information deriving unit derives, on the basis of a revolution of the transmission shaft that transmits a driving force from a drive source of the host vehicle to a wheel and a torque of the transmission shaft, information indicative of a work rate of the transmission shaft. To calculate the work rate of the transmission shaft, the work rate information calculating unit multiplies the revolutions of the transmission shaft per unit time by the torque of the transmission shaft per unit time. In a front-engine rear-wheel-drive vehicle, for example, a propeller shaft may serve as the transmission shaft; however, any transmission shaft capable of obtaining torque may be suitably employed as the transmission shaft. In a front-engine front-wheel-drive vehicle, a drive shaft may serve as the transmission shaft. The revolution of the transmission shaft may be detected using an electromagnetic rotational speed sensor, for example. Alternatively, a strain gauge, or a torque sensor such as a magnetostrictive, optical, or phase difference detection sensor, for example, may be used to detect the torque transmitted by the transmission shaft.

The energy information accumulating unit is not restricted to any particular implementation. Any configuration that is capable of deriving information that indicates the energy required to travel through the road section based on the information indicating the work rate, linking the calculated required energy to the road section and the travel condition information, and accumulating such information may be suitable. Here, information indicating the energy required to travel through the road section may be defined so as not to include energy other than the energy (energy output from the transmission shaft) derived from the calculated work rate per unit time while the host vehicle travels between the start and end points of the road section. Alternatively, the energy required to travel through the road section may be defined so as to include energy other than the energy derived from the work rate.

Note that changes in the host vehicle's weight and the weather condition (a friction coefficient of the road surface), which serve as travel conditions, may cause fluctuations in the torque transmitted by the transmission shaft depending on the change in weight or weather condition. Therefore, the work rate changes in accordance with the torque, and the energy output by the transmission shaft may vary as a consequence. If the energy output by the transmission shaft is obtained based on the work rate and set as the energy required for traveling through the road section, energy that varies in accordance with the host vehicle's weight and the weather condition used as travel conditions can be linked to the travel condition information and accumulated.

On the other hand, changes in the usage state of the electrical component, which can be used as a travel condition, may cause fluctuations in the rechargeable battery energy used depending on the changes in the usage state. In this case, the total energy usage linked to the rechargeable battery energy used may include energy for driving the electrical component, in addition to the energy output by the transmission shaft as described above. Hence, when the usage state of the electrical component is included as a travel condition, information that can evaluate both the energy output by the transmission shaft and the energy corresponding to the electric power consumption of the electrical component is preferably employed as information indicating the energy required for traveling the road section.

In other words, by deriving the work rate based on the revolution and torque of the transmission shaft in the present invention, a main portion of energy usage in each road section can be accurately obtained. Therefore, the energy required for traveling a road section must include the energy output by the transmission shaft. However, the energy required for traveling the road section fluctuates with changes in the usage state of the electrical component used as a travel condition. Therefore, when including the usage state of the electrical component as a travel condition, in order to consider energy fluctuations dependent on the travel condition, the energy corresponding to the electric power consumption of the electrical component is also evaluated as information that indicates the energy required for traveling the road section.

Thus, an example of a suitable constitution to evaluate the energy required for traveling the road section when the usage state of the electrical component is included as a travel condition is a configuration that evaluates an energy efficiency. For example, the energy efficiency may be derived as a ratio of the energy output by the transmission shaft to the energy output from the rechargeable battery. In this example, the energy output from the rechargeable battery includes the energy output by the transmission shaft and energy that corresponds to the electric power consumption of the electrical component. Therefore, by accumulating both the energy output by the transmission shaft and the energy efficiency, the energy output by the transmission shaft can be clearly defined, and the energy usage of the electrical component that corresponds to non-transmission-shaft energy usage can be included in the evaluation of the energy required for traveling the road section.

If the travel condition is classified using categories defined in advance, the categories may be constituted so as to dynamically change. For example, the division of categories is considered excessive if the difference in the energy required for traveling the road section for travel conditions belonging to different categories is equal to or less than a predetermined standard. When excessive division of categories is judged, combining two categories enables adjustment of the number of categories so that a significant number of categories can be achieved over the course of learning even if the travel conditions are classified based on an excessive division of categories at the start of learning. Obviously, the number of categories may also be increased over the course of learning. For example, if two or more peaks appear in a distribution (histogram) of the energy required for traveling the road section in a certain category, the category may be divided into two or more categories to more precisely classify the travel condition. It should be noted that when increasing the number of categories based on the energy distribution, suitable categories may be easily defined with the use of an analysis method such as discriminant analysis.

The technique of determining information indicative of the energy required for traveling a particular road section based on information indicative of the work rate derived while the host vehicle travels through the road section, and linking and accumulating the energy required for traveling the road section to the road section and the travel condition information, as in the present invention, can also be applied in the forms of a method and a program. Moreover, the travel energy learning device, method, and program, as described above, may be implemented in various embodiments, for example, as a stand-alone device, or as discrete parts used in common with certain components provided in the vehicle, or implemented through cooperation with components not provided in the vehicle. The present invention may also be modified as desired, such as by providing a portion of it in the form of software and a portion of it in the form of hardware, for example. The present invention may also be practiced in the form of a storage medium for a program that controls the travel energy learning device. Obviously, such a software storage medium may be a magnetic storage medium, and it may also be a magneto optical storage medium. Furthermore, any storage medium developed henceforth can also be considered to be exactly the same.

DETAILED DESCRIPTION OF THE EMBODIMENTS

Figure 1:
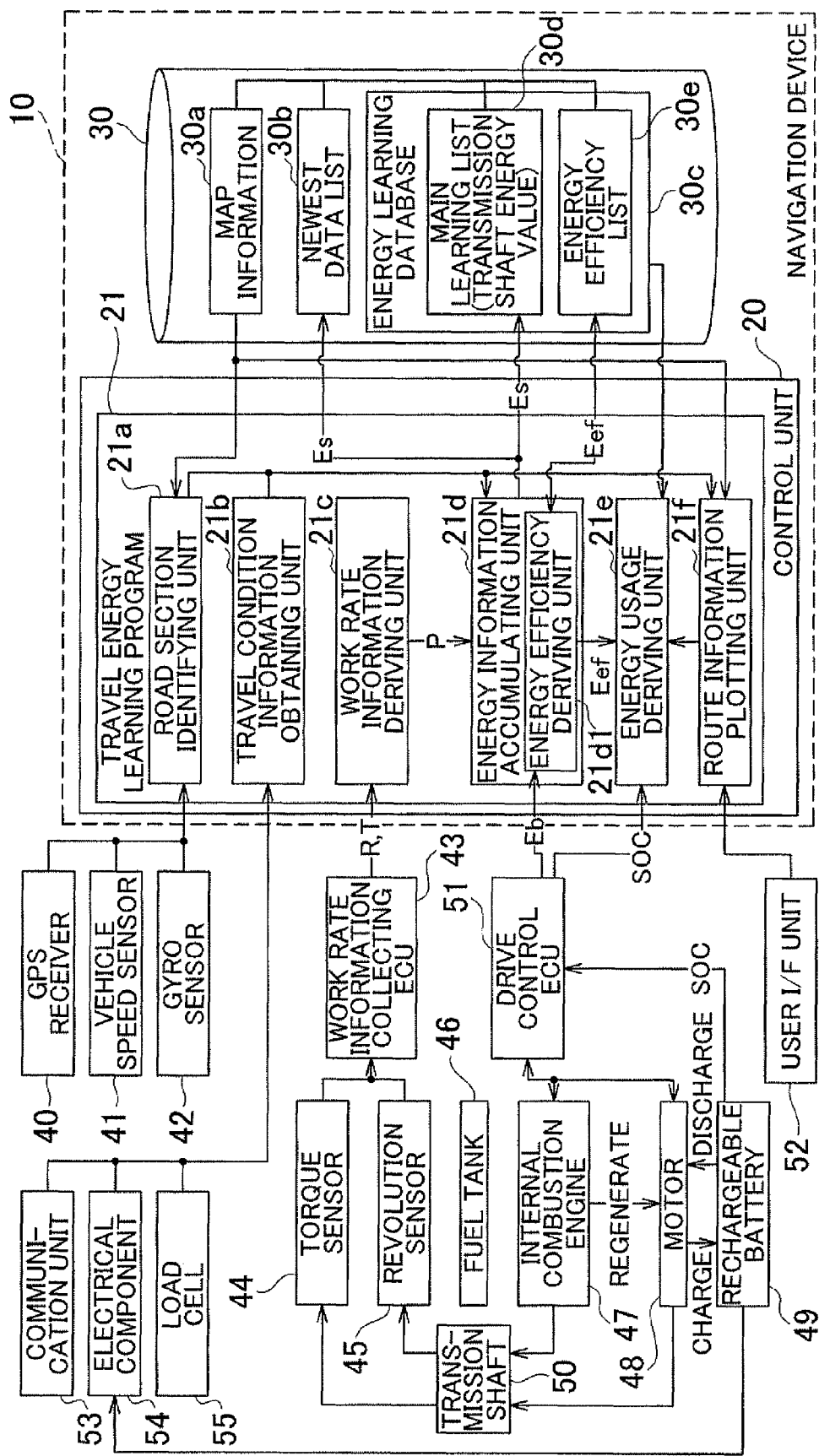
FIG. 1 is a block diagram showing a travel energy learning device.

Hereinafter, an embodiment of the present invention will be described in the following order.
(1) Configuration of Travel Energy Learning Device
(2) Travel Energy Learning Processing
    (2-1) Energy Learning Processing
    (2-2) Energy Efficiency Deriving Processing
    (2-3) Learning Data Usage Processing
(3) Other Embodiments (1) Configuration of Travel Energy Learning Device FIG. 1 is a block diagram showing the configuration of a travel energy learning device installed in a vehicle. The travel energy learning device of the present embodiment is implemented by a navigation device 10. The navigation device 10 includes a control unit 20 that has a CPU, a RAM, a ROM, and the like, and a memory medium 30. The navigation device 10 executes programs accumulated in the memory medium 30 and the ROM using the control unit 20. In the present embodiment, a travel energy learning program 21 is one such program that may be executed by the control unit 20. To implement the learning function carried out by the travel energy learning program 21, the following parts (40 to 55) are provided in the host vehicle.

A GPS receiver 40 receives radio waves from a GPS satellite and outputs a signal for calculating the current position of the host vehicle and a signal that specifies current date and time to the control unit 20 via an interface (not shown). Thus, the control unit 20 obtains the current position of the host vehicle and the current date and time. A vehicle speed sensor 41 outputs a signal to the control unit 20 that indicates the rotational speed of a wheel provided in the host vehicle. The control unit 20 obtains the signal from the vehicle speed sensor 41 via an interface (not shown) to obtain the speed of the host vehicle. A gyro sensor 42 detects the angular acceleration of the host vehicle when turning within a horizontal plane and outputs a signal that indicates the travel direction of the host vehicle to the control unit 20. The control unit 20 obtains this signal via an interface (not shown) to obtain the travel direction of the host vehicle. The vehicle speed sensor 41 and the gyro sensor 42 are used to correct the current position of the host vehicle as determined based on the output signal of the GPS receiver 40. The control unit 20 may correct the current position of the host vehicle as appropriate upon verification with map information 30a described later.

The vehicle of the present embodiment is a hybrid vehicle provided with an internal combustion engine 47 and a motor 48 as drive sources. The internal combustion engine 47 generates a driving force using fuel accumulated in a fuel tank 46, and the motor 48 generates a driving force using a rechargeable battery 49. The internal combustion engine 47 and the motor 48 are connected to a power transmission mechanism (not shown) that includes a transmission shaft 50, and the power transmission mechanism converts the rotational driving force from the internal combustion engine 47 and the motor 48 into a vehicle propulsion force to drive the vehicle. The vehicle may be driven by either or both the internal combustion engine 47 and the motor 48. Furthermore, a portion of the rotational driving force generated by the internal combustion engine 47 may be transmitted to the motor 48 as regenerative energy, and the resulting electric power generated by the motor 48 is accumulated in the rechargeable battery 49.

The internal combustion engine 47 and the motor 48 are controlled by a drive control ECU 51. The drive control ECU 51 controls the internal combustion engine 47 and the motor 48 by outputting control signals to the internal combustion engine 47 and the motor 48 such that either or both the internal combustion engine 47 and the motor 48 generate a rotational driving force. Therefore, in the present embodiment, driving and stopping of the internal combustion engine 47, charging by the motor 48, and driving of the motor 48 through discharging of the rechargeable battery 49 are selectively performed depending on the control signal output by the drive control ECU 51. The drive control ECU 51 also obtains a remaining charge amount [%] (i.e., state of charge or SOC) from the rechargeable battery 49.

The transmission shaft 50 comprises part of the power transmission mechanism, which transmits the driving force from the drive sources to the drive wheels (not shown). If the host vehicle is a front-engine rear-wheel-drive vehicle, for example, then a propeller shaft serves as the transmission shaft 50. A torque sensor 44 that detects a torque acting on the transmission shaft 50, and a revolution sensor 45 that detects a revolution of the transmission shaft 50 are provided in the present embodiment. A strain gauge may be adopted as the torque sensor 44. As for the strain gauge, a resistor (metal foil) is attached to the transmission shaft 50 via a thin insulator, and deformation of the transmission shaft 50 is accompanied by deformation of the resistor at the same rate. The torque is then measured by converting the change in electrical resistance caused by such deformation into a change in voltage. In addition, conventional torque sensors such as a magnetostrictive, optical, or phase difference detection sensor may also be adopted. A work rate information collecting ECU 43 obtains a control signal that indicates the torque from the torque sensor 44 and also obtains a signal that indicates the revolutions from the revolution sensor 45, and outputs the signals to the control unit 20.

A user interface unit 52 allows the input of a user's instructions and provides various information to the user. Although not shown, the user interface unit 52 may include a speaker, a touch panel display, switches, etc. By operating the user interface unit 52, the user can set a destination for the navigation device 10.

A communication unit 53 is formed from a circuit for communicating with an information transmitter outside the host vehicle. The control unit 20 obtains information that indicates the weather condition by controlling the communication unit 53 through an interface (not shown). An electrical component 54 is equipment that is driven by electric power accumulated in the rechargeable battery 49. In the present embodiment, the electrical component 54 comprises the air conditioner, headlights, and the like. The control unit 20 can control the electrical component 54 through an interface (not shown), and determine the usage state of the electrical component 54. Note that the electrical component 54 may include various devices in addition to the air conditioner and headlights (which are used to determine the travel condition), provided that the devices are driven by electric power accumulated in the rechargeable battery 49. A load cell 55 is a sensor that measures the weight on the seats and cargo space. The control unit 20 obtains an output signal of the load cell 55 through an interface (not shown), and obtains an increase in the weight of the host vehicle (a difference in the vehicle total weight and vehicle body weight) based on the output signal.

When the travel energy learning program 21 is executed, the control unit 20 carries out energy learning, derives an energy efficiency, and predicts an energy usage. Accordingly, the travel energy learning program 21 is provided with a road section identifying unit 21a, a travel condition information obtaining unit 21b, a work rate information deriving unit 21c, an energy information accumulating unit 21d (that includes an energy efficiency deriving unit 21d1), an energy usage deriving unit 21e, and a route information plotting unit 21f. Map information 30a is also accumulated in the memory medium 30. The map information 30a includes node data that indicates nodes set on roads; shape interpolating data that indicates the shape of the road between nodes; link data that indicates connections between nodes; gradient data that indicates the road gradient; gradient change data that indicates a point at which the road gradient changes; and data that indicates objects present on or around a road. The map information 30a is used to identify a road section in which the host vehicle is currently located, perform a route search to a destination, perform route guidance to the destination, and the like.

In the control unit 20, the road section identifying unit 21a obtains the information that specifies the current position of the host vehicle and identifies the road section where the host vehicle is located. The term "road section" refers to a road section used as a unit to calculate the energy required for traveling the road section in the energy information accumulating unit 21d. In the present embodiment, the term corresponds to a road section or a section divided by nodes, shape interpolating points, gradient changes, and the like in the map information 30a. The control unit 20 obtains the output signals of the GPS receiver 40, the vehicle speed sensor 41, and the gyro sensor 42, and obtains information specifying the current position of the host vehicle through the process executed by the road section identifying unit 21a. The control unit 20 then refers to the map information 30a to identify the road section that matches the projected trajectory of the host vehicle from its current position.

In the control unit 20, the travel condition information obtaining unit 21b obtains travel condition information that indicates the travel condition of the host vehicle when traveling the road section. In the present embodiment, the travel condition information for each road section is identified by classifying the weight of the host vehicle, the usage state of the electrical component (the air conditioner and headlights), and the weather condition into a plurality of pre-sorted categories.

Specifically, four categories are set in advance with respect to the host vehicle weight: category 0 ($m<M\leq(m+100)$); category 1 ($(m+100)<M\leq(m+200)$); category 2 ($(m+200)<M\leq(m+300)$); and category 3 ($(m+300)<M$). Note that m is the vehicle body weight (kg), and M is the vehicle total weight (kg). The categories are set such that the category changes each time the weight of the host vehicle increases 100 kilograms. Hence, through the process executed by the travel condition information obtaining unit 21b, the control unit 20 obtains an increase in the host vehicle's weight based on the output signal of the load cell 55. The control unit 20 then calculates the vehicle total weight based on the increase and the vehicle body weight to determine the appropriate category, and sets the travel condition information pertaining to the host vehicle's weight to a number (any one of 0 to 3) that corresponds to the appropriate category.

Categories are set in advance for the usage state of the electrical component based on the magnitude of electric power while each electrical component is being used. Regarding the air conditioner, for example, the following four categories are set: category 0 (power source: off); category 1 ($0<Wa\leq100$); category 2 ($100<Wa\leq200$); and category 3 ($200<Wa\leq300$). Note that Wa is the electric power consumption of the air conditioner (W). As for the headlights, two categories are set: category 0 (power source: off); and category 1 (power source: on). Obviously, more categories may be set regarding the "power source: on" status depending on the lighting state of the headlights.

The control unit 20 recognizes a user's operation through an interface (not shown), and outputs a control signal to the electrical component (the air conditioner and headlights) so as to drive the electrical component in accordance with the operation. Thus, the control unit 20 can identify the current usage state of the electrical component. The control unit 20 then determines the category that correspond to the usage state, and sets the travel condition information pertaining to the electrical component to a number (any one of 0 to 3 for the air conditioner, and 0 or 1 for the headlights) that corresponds to the category.

Three categories are set in advance with respect to the weather condition based on the states of rainfall and snowfall:

category 0 (no rainfall or snowfall); category 1 (rainfall); and category 2 (snowfall). Note that in the categories 0, 1 and 2, the road surface is dry, wet, and frozen, respectively. Therefore, if $\mu_1 < \mu_2$, then the friction coefficient $\mu$ of the road surface in each road section is as follows: for category 0, $\mu_2 < \mu$; for category 1, $\mu_1 < \mu \leq \mu_2$; and for category 2, $\mu \leq \mu_1$. The control unit 20 can obtain information that indicates the current weather condition through the communication unit 53. The control unit 20 then determines the category that corresponds to the weather condition, and sets the travel condition information pertaining to the weather condition to a number (any one of 0 to 2) that corresponds to the category.

Through the process executed by the travel condition information obtaining unit 21b as described above, the control unit 20 can determine the travel condition information based on a listing of the category number. For example, the category numbers pertaining to the host vehicle's weight, the air conditioner, the headlights, and the weather condition are listed as 0000, 0001, and so on, and used as the travel condition information. According to this configuration, continuously variable travel conditions such as the host vehicle's weight can be easily determined, and the travel condition information defined in a simple manner.

In the control unit 20, the work rate information deriving unit 21c derives the work rate of the transmission shaft 50 based on the torque and the revolution of the transmission shaft 50. In the present embodiment, the control unit 20 obtains via the work rate information collecting ECU 43 the revolution of the transmission shaft 50 and the torque of the transmission shaft 50 per unit time, and then multiplies the revolutions by the torque to determine information that indicates the work rate (referred to simply as the "work rate" below).

In the control unit 20, the energy information accumulating unit 21d links information that indicates the energy required for traveling a road section with the particular road section and the travel condition information, and accumulates such information in the memory medium 30. Namely, based on the above work rate, the control unit 20 determines an energy efficiency that indicates a ratio of the energy output by the transmission shaft 50 to the energy output from the rechargeable battery 49. Information that indicates the energy output by the transmission shaft 50 (referred to as a transmission shaft energy value below) and the energy efficiency are obtained as information that indicates the energy required for traveling a road section.

Information that indicates the energy required for traveling a road section is linked with the particular road section and the travel condition information, and such information is accumulated in the memory medium 30 as an energy learning database 30c. Note that in the energy learning database 30c shown in FIG. 1, the transmission shaft energy value is accumulated as a main learning list 30d, and the information that indicates the energy efficiency is accumulated as an energy efficiency list 30e. In addition, the transmission shaft energy value may be calculated, for example, by using the work rate calculated per unit time over the time required by the host vehicle to travel from a start point of the road section to an end point of the road section, and the time after the host vehicle passes the start point of the road section until the host vehicle passes the end point.

Figure 2:
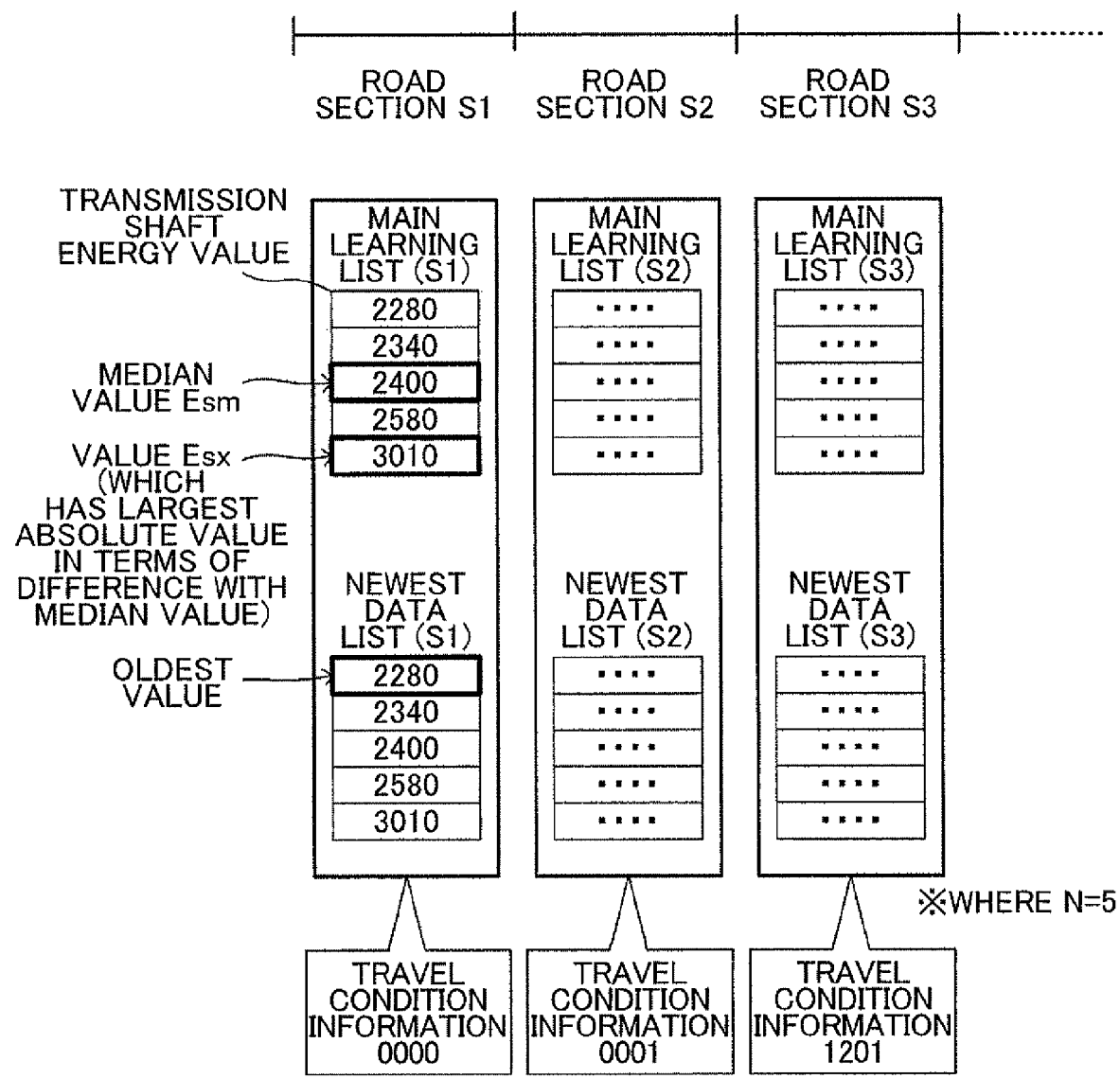
FIG. 2 is a figure for explaining a main learning list and a newest data list.

In the present embodiment, the main learning list 30d and a newest data list 30b are linked to arbitrary road sections for energy learning, and accumulated in the memory medium 30 (see FIG. 2). The main learning list 30d has data areas that accumulate an N quantity of transmission shaft energy values, and the newest data list 30b has data areas that similarly accumulate an N quantity of transmission shaft energy values. In the main learning list 30d, if an energy value is newly derived when an N quantity of transmission shaft energy values is already accumulated, then depending on the N quantity of transmission shaft energy values already accumulated it is determined whether to accumulate the newly derived transmission shaft energy value.

Specifically, a median value $E_{sm}$ is obtained from among the N quantity of transmission shaft energy values already accumulated. A transmission shaft energy value $E_{sx}$, which has the largest absolute value in terms of a difference with the median value $E_{sm}$, is selected from an N−1 quantity of energy values excluding the median value $E_{sm}$. Then, the absolute value of the difference between a newly derived transmission shaft energy value $E_s$ and the median value $E_{sm}$ is calculated. Next the absolute value of the difference between $E_{sm}$ and $E_{sx}$ ($|E_{sx}-E_{sm}|$) and the absolute value of the difference between $E_{sm}$ and $E_s$ ($|E_s-E_{sm}|$) are compared. If ($|E_{sx}-E_{sm}|$) is larger than ($|E_s-E_{sm}|$), then the former is discarded and the newly derived transmission shaft energy value $E_s$ is added to the main learning list. If $|E_{sx}-E_{sm}|$ is smaller than $|E_s-E_{sm}|$, then the main learning list 30d is not updated.

The energy usage deriving unit 21e described later refers to the median value among the 1 to N quantity of transmission shaft energy values accumulated in the main learning list 30d. Namely, according to the present embodiment, the derivation of sporadic largely different transmission shaft energy values will have hardly any effect. The newest data list 30b may be a FIFO type list wherein, if a newly derived transmission shaft energy value is accumulated when an N quantity of transmission shaft energy values is already accumulated, then the oldest accumulated transmission shaft energy value is discarded and the newly derived transmission shaft energy value is accumulated. Through the process executed by of the energy information accumulating unit 21d, the control unit 20 links the main learning list 30d that accumulates information as described above to the road section and the travel condition information, and such information is accumulated as a portion of the energy learning database 30c.

The energy efficiency deriving unit 21d1 of the control unit 20 derives the energy efficiency, which indicates a ratio of the transmission shaft energy value to the energy output from the rechargeable battery 49 when the host vehicle is traveling using the driving force from the motor 48. For a hybrid vehicle, the energy efficiency deriving unit 21d1 derives the energy efficiency when the internal combustion engine 47 is not used to drive the vehicle. The energy efficiency is regularly updated. To reduce the effects of noise, in the present embodiment, a value that indicates a plurality (M quantity) of energy efficiencies is linked with the particular road section and the travel condition information, and such information is accumulated in the memory medium 30 as the energy efficiency list 30e. For the energy efficiency as well, the median value among the M quantity of values is employed in the energy usage deriving unit 21e described later.

Note that the transmission shaft energy value and the energy efficiency in the present embodiment may fluctuate depending on the travel condition; the transmission shaft energy value mainly fluctuates in accordance with the host vehicle's weight and the weather condition (a friction coefficient of the road surface), and the energy efficiency fluctuates in accordance with the usage state of the electrical component. That is, if the host vehicle's weight or the weather condition has changed, the torque of the transmission shaft may also vary despite traveling the same road section using the same speed pattern. Therefore, the work rate output by the transmission shaft fluctuates, and the transmission shaft energy value also fluctuates. By linking the travel condition information and the transmission shaft energy value and accumulating such information in the main learning list 30*d*, different transmission shaft energy values per travel condition can be accurately determined.

On the other hand, when the usage state of the electrical component changes, the rechargeable battery energy used also changes in accordance with the change in the usage state. Therefore, the rechargeable battery energy used may vary and the energy efficiency may also vary despite traveling the same road section using the same speed pattern. By linking the travel condition information and the energy efficiency and accumulating such information in the energy efficiency list 30*e*, different energy efficiencies for every travel condition can be accurately determined. Note that in the present embodiment, both the transmission shaft energy value and the energy efficiency may differ depending on different travel conditions. However, because the transmission shaft energy value is determined by directly measuring the torque transmitted by the transmission shaft 50, the work rate may be accurately derived based on the revolutions and the torque. It is thus possible to accurately derive the transmission shaft energy value for each road section.

As explained above, the control unit 20 can build the energy learning database 30*c* through the processes executed by the road section identifying unit 21*a*, the travel condition information obtaining unit 21*b*, the work rate information deriving unit 21*c*, and the energy information accumulating unit 21*d*. However, the navigation device 10 of the present embodiment also has a function to utilize the energy learning database 30*c*. Namely, the route information plotting unit 21*f* and the energy usage deriving unit 21*e* execute processes in the control unit 20 for using the energy learning database 30*c*.

More specifically, the route information plotting unit 21*f* of the control unit 20 obtains route information that specifies a route from a departure point to a destination and estimates the travel condition when traveling the route. In the present embodiment, the current position of the host vehicle corresponds to the departure point. The control 20 obtains information that specifies the destination input to the user interface unit 52 by the user, searches for a route from the current position of the host vehicle to the destination, and obtains route information that specifies the route. In addition, based on the output signal of the load cell 55, the current weight of the host vehicle is determined, and the current usage state of the electrical component 54 is also determined. The travel condition information is determined by considering travel on the route with the current weight of the host vehicle and usage status of the electrical component 54. Furthermore, the communication unit 53 obtains information that indicates the weather condition, and the travel condition information is also determined by obtaining information that indicates the weather condition in each road section at the estimated time that the host vehicle will pass through each road section on the route.

The energy usage deriving unit 21*e* of the control unit 20 derives the rechargeable battery 49 energy used based on the energy learning database 30*c*, assuming that the host vehicle is traveling on a specific route under a specific travel condition. Namely, the traveling condition information is obtained for each road section on the route determined by the processing of the route information plotting unit 21*f*. The energy usage deriving unit 21*e* then refers to the main learning list 30*d* and the energy efficiency list 30*e* to obtain the transmission shaft energy value $E_s$ and an energy efficiency $E_{ef}$ linked to the travel condition information for each road section.

Based on the transmission shaft energy value $E_s$ and the energy efficiency $E_{ef}$, an energy usage $E_b$ of the rechargeable battery 49 is derived, assuming that the host vehicle is traveling the road section using the driving force from the motor 48. The energy usage $E_b$ represents the energy of the rechargeable battery 49 that would be used by the host vehicle traveling through the applicable road section in EV mode alone. The transmission shaft energy value $E_s$ in the above process is determined by directly measuring the torque transmitted by the transmission shaft 50 per travel condition. The energy efficiency $E_{ef}$ is also obtained per travel condition. Therefore, the energy usage for every travel condition in each road section can be accurately predicted.

Note that if the transmission shaft energy value and the energy efficiency linked to the current travel condition information determined by the route information plotting unit 21*f* are not accumulated in the energy learning database 30*c*, corrections may be made based on the transmission shaft energy value and the energy efficiency linked to learned travel condition information. In other words, the electric power consumption in each usage state of the electrical component 54 can be determined in advance based on the specifications of the electrical component 54. Thus, the difference in energy usage for different usage states of the electrical component 54 can also be determined in advance. Increases and decreases in energy usage caused by differences in the host vehicle's weight and the weather condition (the friction coefficient of the road surface) may be considered proportional to the weight and the friction coefficient. In such case, a correction coefficient can be determined in advance for canceling out fluctuations in energy usage caused by variations in the host vehicle's weight and the weather condition.

Hence, the rechargeable battery energy used in each road section linked to the learned travel condition information is derived from the transmission shaft energy value and the energy efficiency linked to the learned travel condition information. In order to cancel out fluctuations in energy usage caused by differences between the learned travel condition and the travel condition determined by the route information plotting unit 21*f*, either the above difference is added to the energy usage linked to the learned travel condition, or the energy usage with the added difference is multiplied by the above correction coefficient.

For example, the learned travel condition information may be designated as 1000. The transmission shaft energy value in such case is 2400 J and the energy efficiency is 75%. This example assumes that the current travel condition information is 2010, that is, the host vehicle's weight is heavier and the headlights are turned on. The correction coefficient that indicates an increase in energy usage caused by the host vehicle's weight changing from category 1 to category 2 is designated as Cw. A difference in energy usage, in which more energy is used when the headlights are turned on than when they are turned off, is designated as Δh. Thus, the post-correction energy usage can be derived as ((2400/0.75)+Δh)}×Cw. The above correction refers to the transmission shaft energy value and the energy efficiency linked to the learned travel condition information, and the energy usage that is derived from the transmission shaft energy value and the energy efficiency linked to the learned travel condition information is an accurate estimate. Using this accurate estimate for the correction thus enables a relatively accurate derivation of energy usage corresponding to unlearned travel condition information, compared to a calculation that does not refer to the transmission shaft energy value and the energy efficiency linked to the learned travel condition information.

(2) Travel Energy Learning Processing

Figure 3:
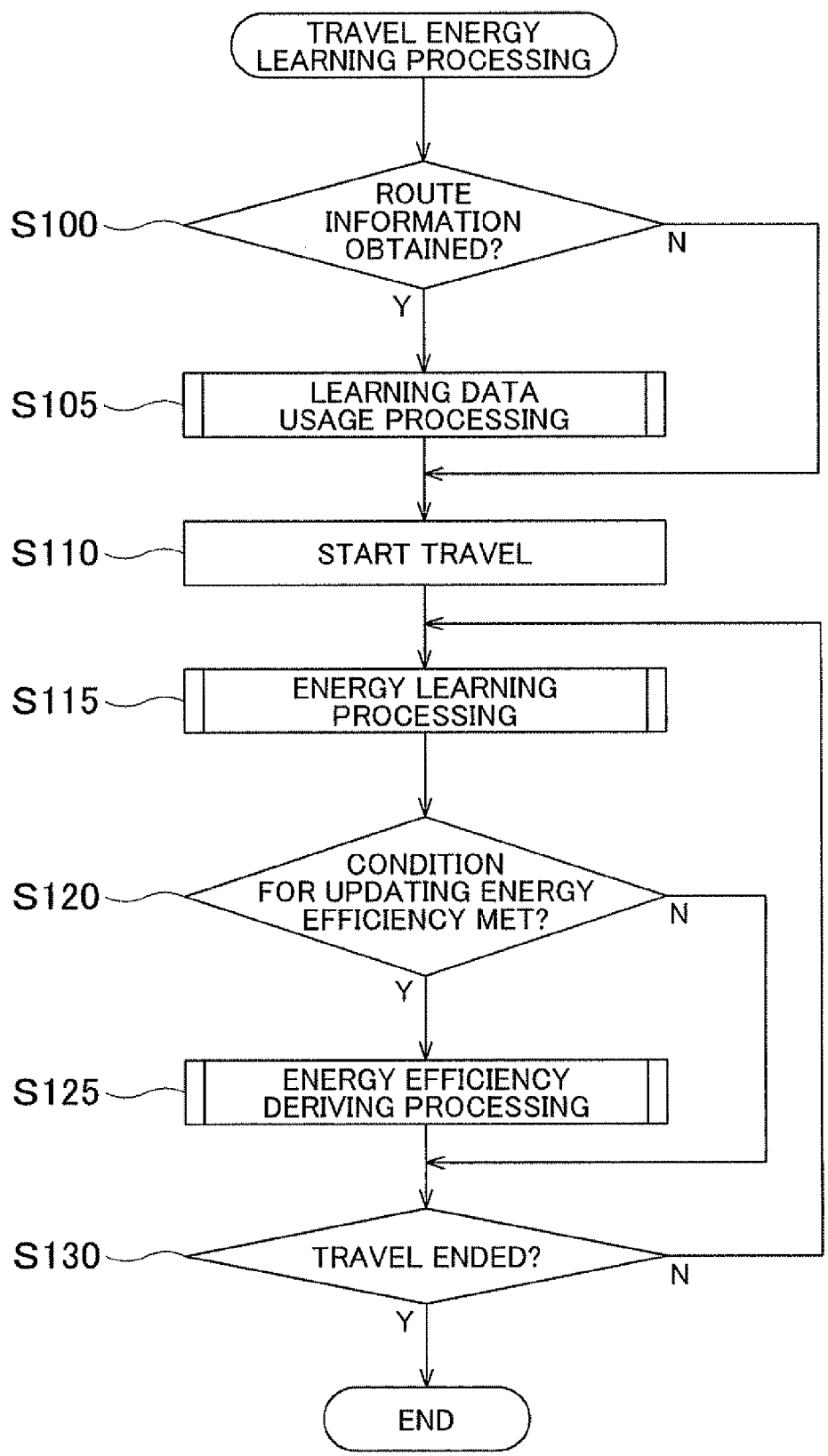
FIG. 3 is a flowchart showing the travel energy learning process.

Next, the travel energy learning process that is executed by the navigation device 10 in the configuration described above will be explained. FIG. 3 is a flowchart showing the travel energy learning process. The control unit 20 first determines whether the route information is obtained (S100). If the route information has been obtained, then the control unit 20 executes the learning data usage process (S105, FIG. 7). The control unit 20 next waits until the host vehicle starts traveling (S110). After detecting the start of travel, the control unit 20 executes the process from S115 to S125 at predetermined intervals until it is determined that travel has ended at S130. In other words, while the vehicle is traveling, the control unit 20 executes the energy learning process (S115, FIG. 4), determines whether a condition for updating the energy efficiency is satisfied (S120), and executes the energy efficiency derivation process if it is determined that the condition for updating the energy efficiency is satisfied (S125, FIG. 6).

Note that the determinations regarding the start and end of travel at S110 and S130 may utilize, for example, a vehicle speed signal obtained from the vehicle speed sensor 41, or ignition on and off signals. The condition for updating the energy efficiency at S120 is satisfied when the host vehicle has traveled in EV mode only for a predetermined number of minutes after a previous update or after the route has been set.

The learning data usage process of S105 uses the learning data accumulated by repeating the process from S115 to S130, and will therefore be described after explaining the energy learning process and the energy efficiency derivation process. Hereinafter, the energy learning process, the energy efficiency derivation process, and the learning data usage process will be explained in order.

(2-1) Energy Learning Processing

Figure 4:
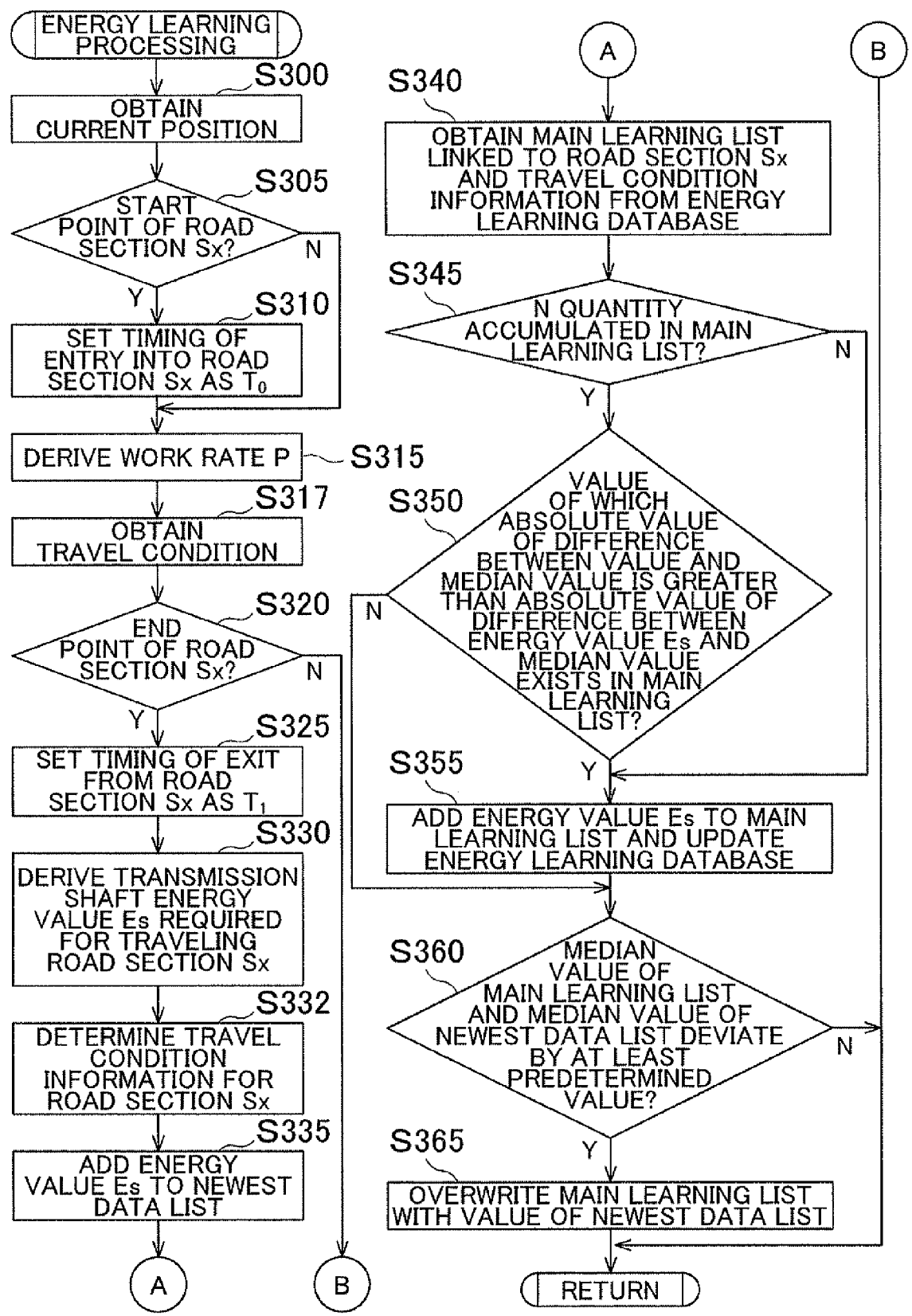
FIG. 4 is a flowchart showing the energy learning process.

The energy learning process at S115 will be explained using a flowchart in FIG. 4. Through the process executed by the road section identifying unit 21a, the control unit 20 first obtains the current position of the host vehicle (S300), and then determines whether the host vehicle has passed the start point of a road section $S_x$ (S305). If it is determined that the host vehicle has passed the start point of the road section $S_x$, then the time at which the host vehicle passed the start point is set as time $T_0$ (S310). Specifically, the control unit 20 determines whether the host vehicle has passed the position of a node or shape interpolating point that corresponds to the start point of the road section $S_x$, and sets the time when the vehicle has passed the start point of the road section $S_x$ as time $T_0$.

Through the process executed by the work rate information deriving unit 21e, the control unit 20 next obtains a revolution R and a torque T of the transmission shaft 50 at predetermined intervals (e.g. 0.5 seconds), and derives an output work rate P [W] of the transmission shaft 50 using formula (1) below (S315).

[Formula 1]

$$P = R \times T \qquad (1)$$

Through the process executed by the travel condition information obtaining unit 21b, the control unit 20 obtains the travel condition information (S317). Namely, the control unit 20 determines the weather condition and the host vehicle's weight based on signals output from the communication unit 53 and the load cell 55, and identifies the usage state of the electrical component 54 that is used in accordance with a control of the control unit 20.

Through the process executed by the road section identifying unit 21a, the control unit 20 subsequently determines whether the host vehicle has passed the end point of the road section $S_x$ (S320). If it is determined that the host vehicle has passed the end point of the road section $S_x$, then the time at which the host vehicle passed the end point is set as time $T_1$ (S325). Specifically, the control unit 20 determines whether the host vehicle has passed a node or shape interpolating point that corresponds to the end point of the road section, the passage of the start point of which was determined at S305, and sets the time when the host vehicle passed the end point of the road section $S_x$ as the time $T_1$. Through the process executed by the energy information accumulating unit 21d, the control unit 20 then calculates the transmission shaft energy value $E_s$ required for traveling through the road section $S_x$ using formula (2) below (S330). Here, AVG refers to an average value of the work rate P.

[Formula 2]

$$E_s = \int_{T_0}^{T_1} P \, dt \qquad (2)$$
$$= AVG(P) \times (T_1 - T_0)$$

Through the process executed by the energy information accumulating unit 21d, the control unit 20 determines the travel condition information of the road section $S_x$ (S332). Namely, the travel condition information is obtained by determining the categories of the host vehicle's weight, the usage state of the electrical component 54, and the weather condition, which were obtained at S317.

Figure 5A:
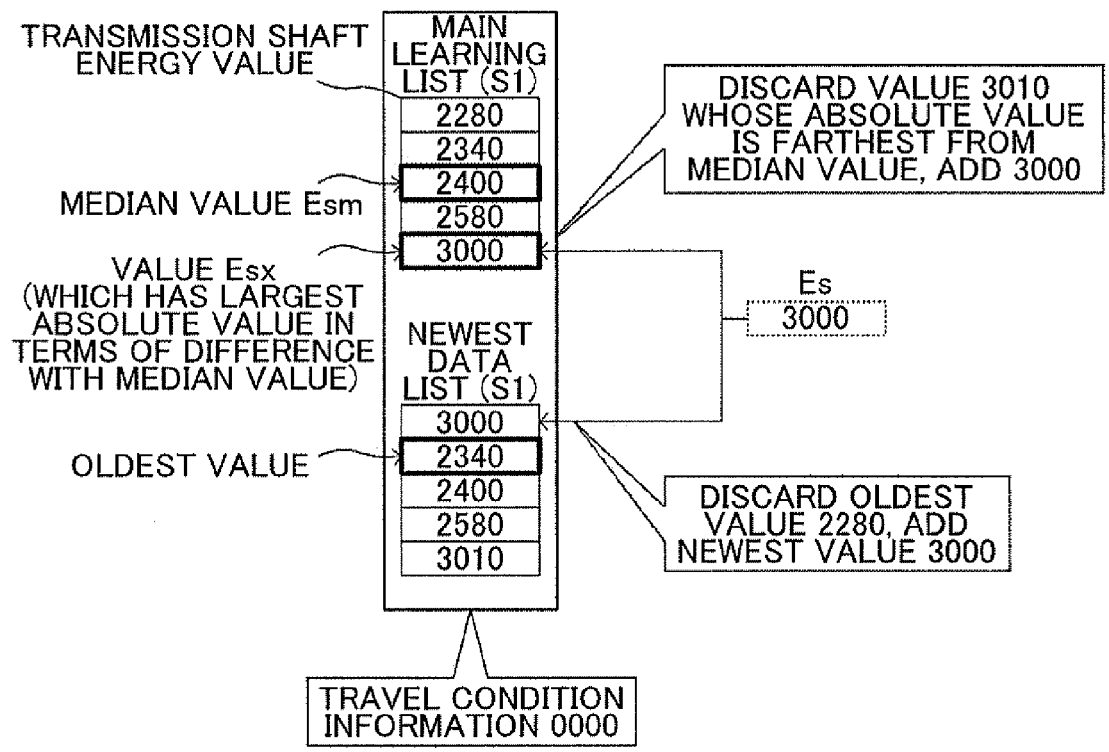
FIGS. 5A and 5B are figures for explaining updating of the main learning list and the newest data list.

Through the process executed by the energy information accumulating unit 21d, the control unit 20 adds the transmission shaft energy value $E_s$ calculated using formula (2) to the newest data list 30b linked to the road section $S_x$ and the travel condition information obtained at S332 (see S335, FIGS. 2 and 5A). Through the process executed by the energy information accumulating unit 21d, the control unit 20 next obtains the main learning list 30d linked to the road section $S_x$ and the travel condition information obtained at S332 from the energy learning database 30c (S340), and determines whether an N quantity of data linked to the road section $S_x$ and the travel condition information obtained at S332 is already accumulated (S345). If it is determined that the N quantity of data is already accumulated in the main learning list 30d, then the control unit 20 determines whether a value, of which the difference between the value and the median value is greater than the absolute value of the difference between the energy value $E_s$ and the median value, exists in the main learning list 30d (S350). Namely, the N quantity of transmission shaft energy values is obtained, and absolute values $\Delta_1$ to $\Delta_{N-1}$ of the difference between the median value $E_{sm}$ and the other N−1 quantity of transmission shaft energy values are calculated. An absolute value $\Delta_s$ of the difference between the median value $E_{sm}$ and the transmission shaft energy value $E_s$ derived at S330 is also calculated. If a value larger than $\Delta_s$ exists among $\Delta_1$ to $\Delta_{N-1}$, it is determined that a value, of which the absolute value of the difference between the value and the median value is larger than the absolute value of the difference between the energy value $E_s$ and the median value, exists in the main learning list 30d.

If a value, of which the difference between the value and the median value is greater than the absolute value of the difference between the energy value $E_s$ and the median value, exists in the main learning list 30d, the transmission shaft energy value $E_{sx}$ is discarded from the main learning list 30d. The transmission shaft energy value $E_s$ currently calculated is then added to the main learning list 30d linked to the road section $S_x$ and the travel condition information obtained at S332 (S335), whereby the energy learning database 30c is updated (see FIGS. 2 and 5A). However, if it is determined that there is no value of which the absolute value of the difference between the value and the median value is greater than the absolute value of the difference between the energy value $E_s$ and the median value, the currently calculated transmission shaft energy value $E_s$ is not added to the main learning list 30d linked to the road section $S_x$ and the travel condition information obtained at S332. Accordingly, the energy learning database 30c is not updated.

Figure 5B:
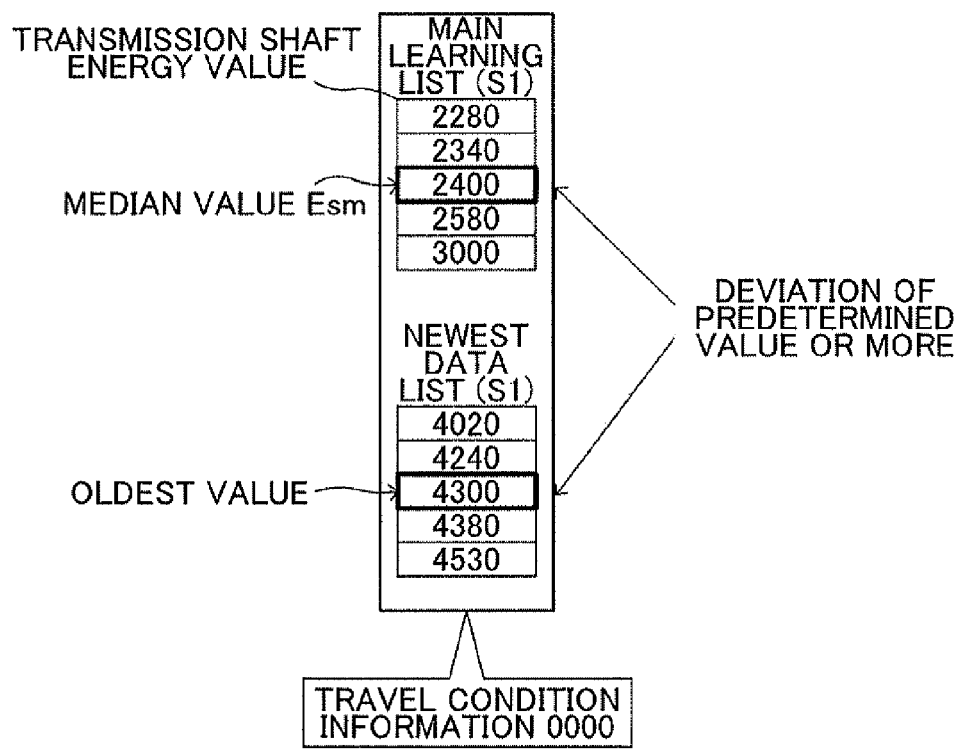

Through the process executed by the energy information accumulating unit 21d, the control unit 20 determines whether the median value $E_{sm}$, of the main learning list 30d linked to the road section $S_x$ and the travel condition information obtained at S332 and a median value of the newest data list 30b linked to the road section $S_x$ and the travel condition information obtained at S332 deviate by at least a predetermined value (S360). If the median values deviate by at least the predetermined value, then the main learning list 30d is overwritten with the value of the newest data list 30b (S365) (see FIG. 5B). Thus, by providing the FIFO type newest data list 30b in addition to the main learning list 30d in the present embodiment, non-sporadic (non-noise) characteristic changes of the road section may also be accommodated. For example, if a certain road section is undergoing road work, the road section is likely to be traveled at a lower speed than when road work is not being performed. If the main learning list is created when the road section is undergoing road work, then the transmission shaft energy value derived when the host vehicle travels through the road section after completion of the road work deviate significantly from the transmission shaft energy value already accumulated in the main learning list. As a consequence, transmission shaft energy values for the road section after completion of the road work would always be discarded and the main learning list would not be updated. However, because a FIFO type of newest data list is provided and the main learning list is updated with the content of the newest data list when the median value of the newest data list deviates significantly from the median value of the main learning list, transmission shaft energy values calculated after the completion of road work can also be accumulated.

Note that when selecting the median value in the newest data list and the main learning list, if the quantity of transmission shaft energy values already accumulated in the respective lists is an even number, then the two transmission shaft energy values closest to the middle when arranging the energy values in an ascending or descending order are selected, and an average value of the two transmission shaft energy values is adopted as the median value.

(2-2) Energy Efficiency Deriving Processing

Figure 6:
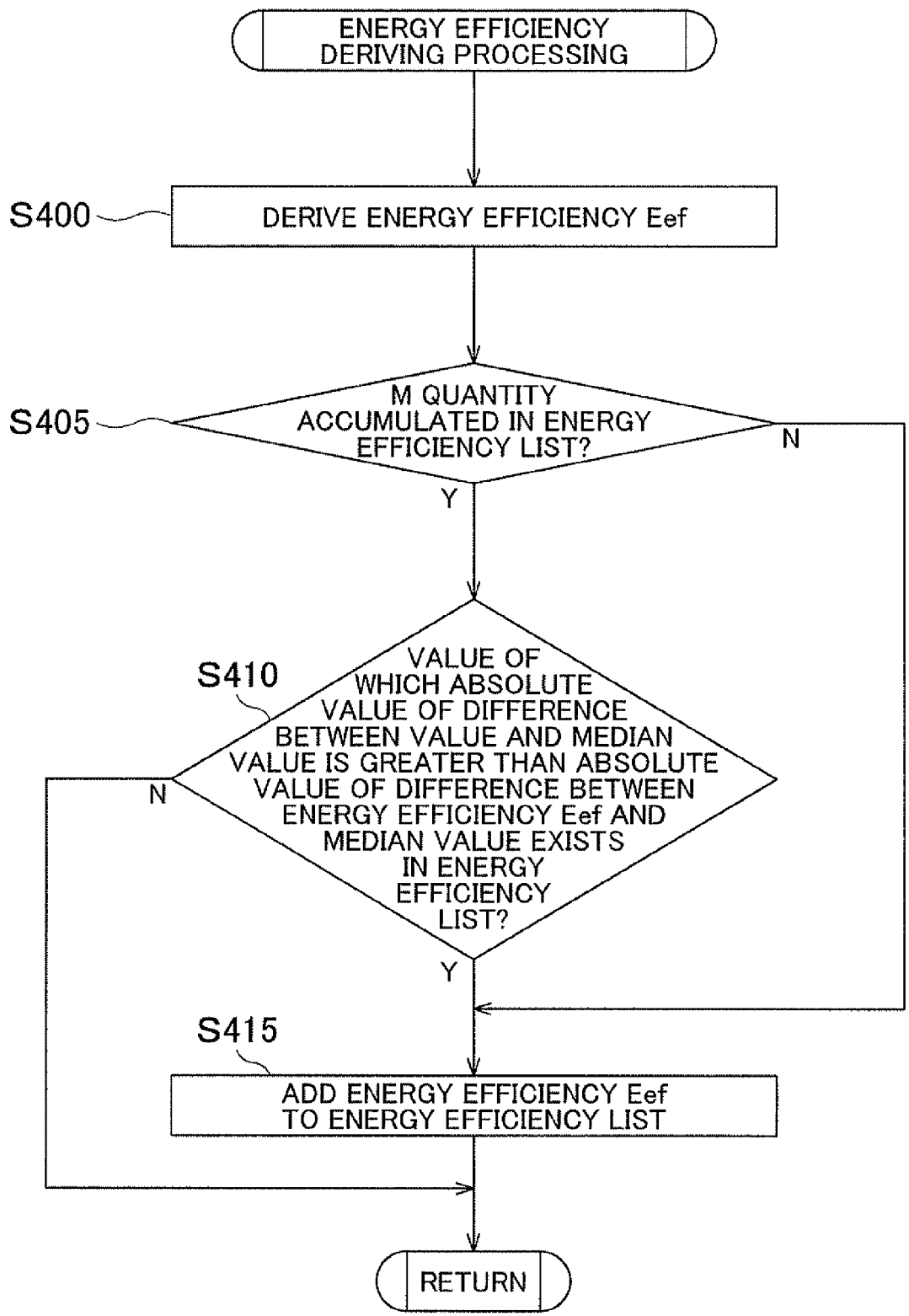
FIG. 6 is a flowchart showing the energy efficiency deriving process.

The energy efficiency deriving process at 5125 of FIG. 3 will be explained using a flowchart in FIG. 6. The energy efficiency deriving process is carried out by the energy efficiency deriving unit 21d1 in the control unit 20, and is executed at predetermined intervals (e.g. every second) when the condition for updating the energy efficiency is satisfied. The control unit 20 first derives the energy efficiency $E_{ef}$ [%] linked to the road section $S_x$ and the travel condition information obtained at S332 (S400). Namely, the control unit 20 obtains an energy value $E_b$ [J] output from the rechargeable battery 49 while the host vehicle travels the road section $S_x$ without using the internal combustion engine, and obtains the transmission shaft energy value $E_s$ [J] actually output by the transmission shaft 50. The control unit 20 then calculates the energy efficiency $E_{ef}$ [%] using formula (3) below.

[Formula 3]

$$E_{ef}=(E_s/E_b)\times 100 \qquad (3)$$

Through the process executed by the energy efficiency deriving unit 21d1, the control unit 20 subsequently refers to the energy efficiency list 30e, and determines whether an M quantity of energy efficiency $E_{ef}$ data linked to the road section $S_x$ and the travel condition information obtained at S332 has been accumulated (S405). If it is determined that the M quantity of data is already accumulated in the energy efficiency list 30e, then the control unit 20 determines whether a value, of which the difference between the value and the median value is greater than the absolute value of the difference between the energy efficiency $E_{ef}$ and the median value, exists in the energy efficiency list 30e (S410). However, if it is determined that a value, of which the absolute value of the difference between the value and the median value is greater than the absolute value of the difference between the energy efficiency $E_{ef}$ and the median value, exists in the energy efficiency list 30e, that value is discarded from the energy efficiency list 30e. The currently calculated energy efficiency $E_{ef}$ is then added to the energy efficiency learning list 30e linked to the road section $S_x$ and the travel condition information obtained at S332 (S415).

(2-3) Learning Data Usage Processing

Figure 7:
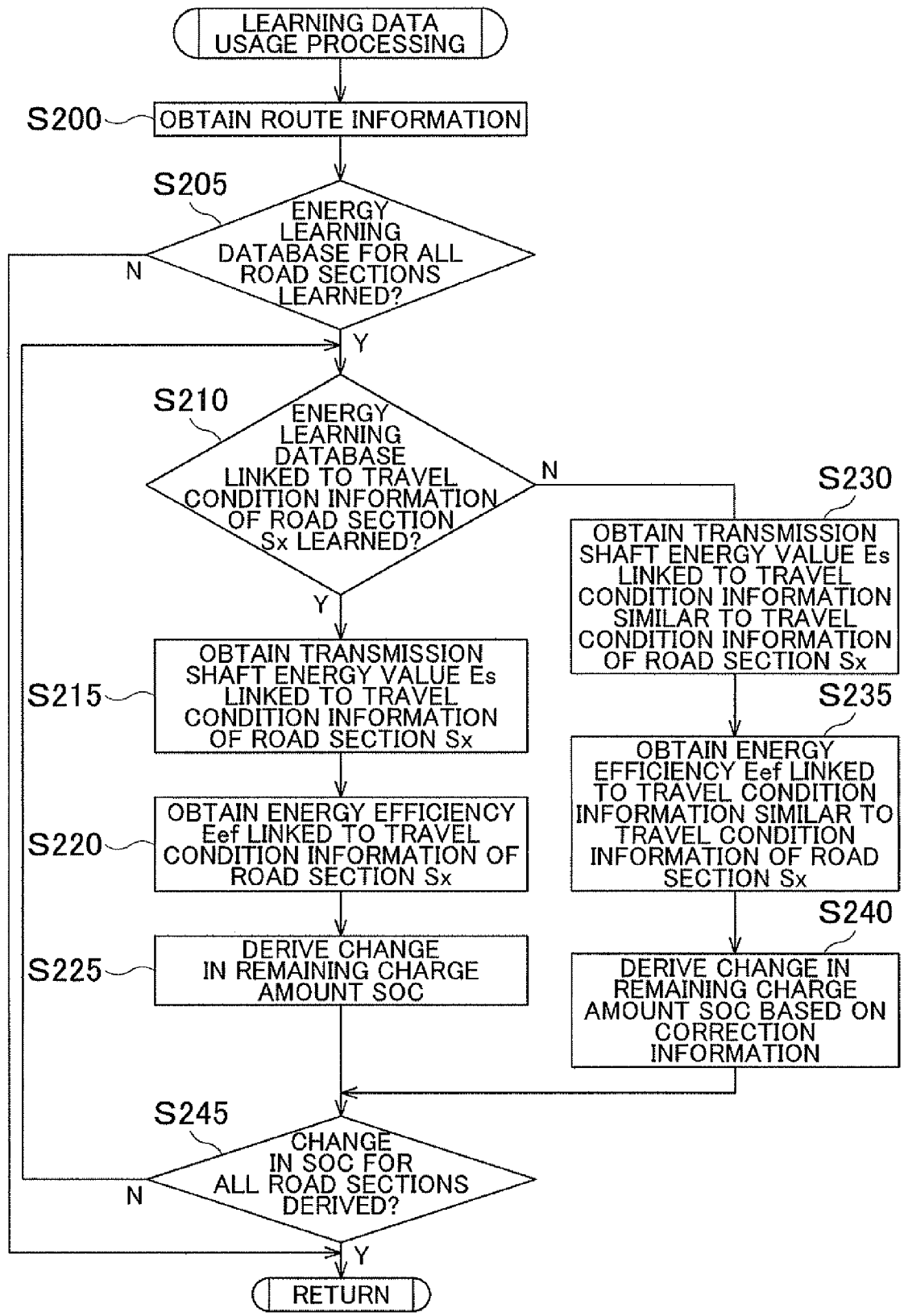
FIG. 7 is a flowchart showing the learning data usage process.

FIG. 7 is a flowchart showing the learning data usage process. Through the processing executed by the route information plotting unit 21f, the control unit 20 first obtains the route information (S200). Through the process executed by the energy usage deriving unit 21e, the control unit 20 next determines whether the energy learning database 30c pertaining to all the road sections comprising the route has been learned (S205). Specifically, the control unit 20 determines whether the corresponding transmission shaft energy value and energy efficiency for each road section of the route is accumulated in the main learning lists 30d. An N quantity of transmission shaft energy values and energy efficiencies need not be accumulated in the main learning lists 30d linked to the road sections, and even the accumulation of one transmission shaft energy value and energy efficiency is acceptable. If no transmission shaft energy values and energy efficiencies pertaining to the plurality of road sections comprising the route have been learned, then the learning data usage processing ends.

If the energy learning database 30c is determined as learned at S205, the control unit 20 selects one of the road sections comprising the route and determines whether the energy learning database 30c linked to the travel conditions in the particular road section is learned (S210). Namely, as the travel conditions when traveling the road section, the control unit 20 obtains information that indicates the host vehicle's current weight, the current usage status of the electrical component 54, and the weather condition in the road section. The control unit 20 then identifies the categories corresponding to each travel condition to determine the travel condition information. The control unit 20 next determines whether the transmission shaft energy value and the energy efficiency linked to the travel condition information is accumulated as the energy learning database 30c.

If it is determined at S210 that the energy learning database 30c linked to the travel conditions in the road section has been learned, then through the process executed by the energy usage deriving unit 21e, the control unit 20 obtains the transmission shaft energy value $E_s$ linked to the travel condition information of the road section (S215), and obtains the energy efficiency $E_{ef}$ linked to the travel condition information of the road section (S220). That is, the control unit 20 selects and extracts a value equivalent to the median value from among the data accumulated in the main learning list 30d and the energy efficiency list 30e linked to the travel condition information.

Through the process executed by the energy usage deriving unit 21e, the control unit 20 next derives a change in the remaining charge amount (S225). Specifically, the control unit 20 obtains the current SOC from the drive control ECU 51, and uses the energy efficiency $E_d$ and the transmission shaft energy value $E_s$ to calculate an energy usage $E_x$ for the road section $S_x$ from formula (4) below. Using an energy E [J] per 1% when the maximum charge of the rechargeable battery 49 is 100%, the energy usage $E_x$ for the road section $S_x$ is converted into an electric power consumption rate $Q_x$ [%] of the rechargeable battery 49 for the road section $S_x$ based on formula (5) below.

[Formula 4]

$$E_x = E_s / E_{ef} \quad (4)$$

[Formula 5]

$$Q_x = E_x / E \quad (5)$$

Formula (6) below is applied to all the road sections $S_x$ comprising the route.

[Formula 6]

$$\text{SOC at end of travel in road section } S_x = \text{SOC at end of travel in road section } S_{x-1} - Q_x \text{ of road section } S_x \quad (6)$$

Note that the phrase "SOC at end of travel in road section $S_x$" refers to the remaining charge amount after traveling from the departure point of the route to the end point of the road section $S_x$. Similarly, the meaning of the phrase "SOC at end of travel in road section $S_{x-1}$" refers to the remaining charge amount after traveling from the departure point of the route to the end point of the road section $S_{x-1}$.

If it is determined at S210 that the energy learning database 30c linked to the travel conditions in the road section $S_x$ has not been learned, then through the process executed by the energy usage deriving unit 21e, the control unit 20 uses the energy learning database 30c linked to learned travel condition information similar to the travel condition information of the road section $S_x$ to calculate the remaining charge amount. Therefore, the control unit 20 obtains the transmission shaft energy value $E_s$ and the energy efficiency $E_{ef}$ linked to the travel condition information most similar to the travel condition information of the road section $S_x$ (S230, S235).

Next, the change in the remaining charge amount is derived based on the correction information for correcting the energy usage in the travel condition information of the road section $S_x$ to the energy usage in the travel condition information most similar to the travel condition information of the road section $S_x$ (S240). Namely, the transmission shaft energy value $E_s$ and the energy efficiency $E_{ef}$ obtained at S230 and S235 are substituted into formula (4) above to obtain the energy usage $E_x$ in the road section $S_x$. If the travel condition information most similar to the travel condition information of the road section $S_x$ indicates that the electrical component 54 is not in use (or in use) in the travel condition information of the road section $S_x$ exists, the energy usage difference generated as a result of the difference in the usage state of the electrical component 54 between the two traveling conditions is obtained and added to (or subtracted from) the energy usage $E_x$. In other words, if the usage state of the electrical component 54 is different in the two travel conditions, the energy usage will differ depending on the non-use (or use) of the electrical component 54. Hence, the energy usage difference $\Delta h$ is obtained for each usage state, with the usage states determined in advance based on the specifications of the electrical component 54. Accordingly, the energy usage difference $\Delta h$ is considered the difference in energy usage arising from the different travel conditions, and added to (or subtracted from) the energy usage $E_x$.

If the host vehicle's weight increases/decreases or the weather condition differs in the travel condition information most similar to the travel condition information of the road section $S_x$, the correction coefficient is obtained for canceling out variations in the energy usage $E_x$ due to such differences, and the energy usage $E_x$ is multiplied by the correction coefficient ($E_x + \Delta h$ or $E_x - \Delta h$, where $\Delta h \neq 0$). The energy usage is thus corrected, and therefore, the control unit 20 substitutes the obtained result into formula (5) to obtain the electric power consumption rate $Q_x$, and further derives the SOC after the end of travel in the road section $S_x$ in formula (6) using the post-correction electric power consumption rate $Q_x$.

Figure 8:
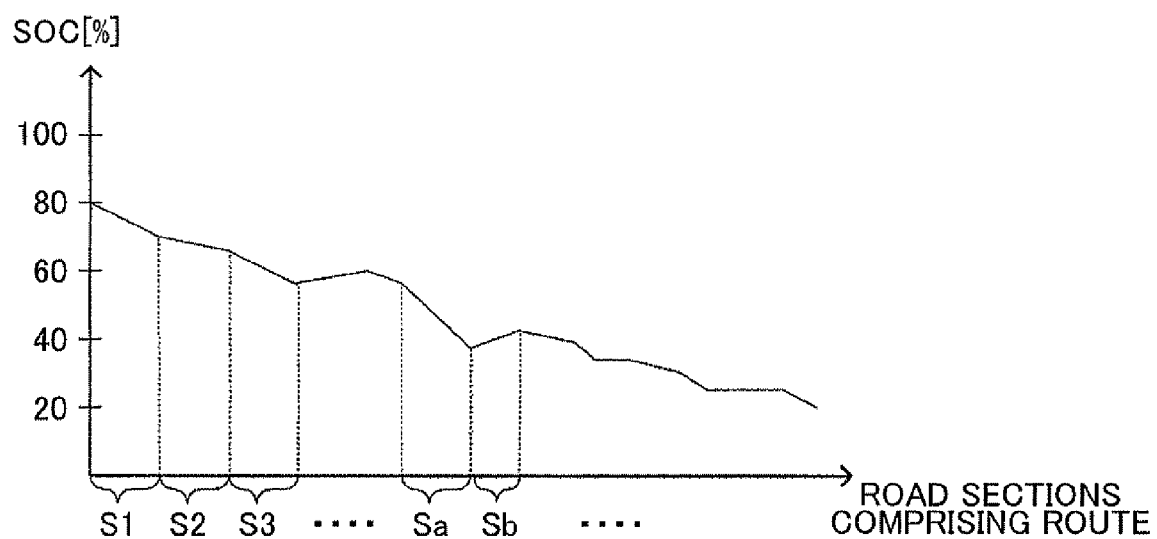
FIG. 8 is a graph for explaining an example of changes in the remaining amount of charge.

The control unit 20 subsequently repeats the process from S210 onward until it is determined that the change in SOC has been derived for all the road sections comprising the route (S245). After it is determined at S245 that the change in SOC has been derived for all the road sections comprising the route, the change in the remaining charge amount SOC [%] can thus be obtained as shown in FIG. 8. Further note that for sections where the SOC is increasing, such as a road section $S_b$ in FIG. 8, the torque value output from the work rate information collecting ECU 43 is a negative value, therefore the energy required for traveling the road section is negative, i.e., energy is being regenerated as the host vehicle travels through the road section.

As described above, the present embodiment has a configuration in which the transmission shaft energy value is derived based on the revolution and the torque transmitted by the transmission shaft 50, and the transmission shaft energy value is linked to the travel condition and accumulated. Therefore, the output value (the energy required to travel through a road section) may be derived more accurately compared to a configuration that calculates the required output value using a travel speed pattern, road grade, road friction coefficient, vehicle weight, air resistance, for example, regardless of the travel condition. According to the present embodiment, the change in energy usage when traveling any route in EV mode only can be predicted per travel condition. Consequently, it is possible to predict for every travel condition the maximum distance that the host vehicle can travel in EV mode alone on the way to the destination, for example. In addition, other possible applications include scheduling such that the internal combustion engine is utilized to travel through sections along the set route where energy usage will be high, such as a road section $S_a$ in FIG. 8, as well as scheduling such that charging by regenerative energy is carried out in road sections where the remaining charge amount increases, such as the road section $S_b$.

(3) Other Embodiments

The embodiment described above is only an illustrative example of the present invention. Various other embodiments may be adopted, provided that information indicative of the energy required for traveling a road section is determined based on information indicative of the work rate derived while the host vehicle travels through the particular road section, and provided that the energy required for traveling the road section is linked to the road section and the travel condition information, and accumulated. For example, although the above embodiment is described in the context of a hybrid vehicle, this embodiment in which an energy value required for traveling a particular road section is linked to the road section and the travel condition information and accumulated may also be applied to an electric vehicle or the like.

The road section is not particularly limited to road sections that are divided by nodes, shape interpolating points, grade changes, and the like in map information; road sections partitioned at arbitrary distance intervals, or a combination thereof may also be acceptable. Any suitably determined road section may be used, provided that a start point and an end point, as well as a road therebetween can be uniquely identified.

In a front-engine front-wheel-drive vehicle, for example, the work rate of the right and left drive shafts are calculated and the sum of the work rates of the right and left drive shafts is output from the work rate information collecting ECU 43.

In the present embodiment, information indicating the energy required for traveling the road section comprises the transmission shaft energy value and the energy efficiency. However, the information indicating the energy required for traveling the road section may include an energy derived based on at least the work rate. Accordingly, the information indicating the energy required for traveling the road section may comprise the transmission shaft energy value and the energy (amount of electric power) actually used by the electrical component 54, for example. Various other configurations are also acceptable. As another example, the information indicating the energy required for traveling the road section may comprise the transmission shaft energy value and the energy actually used by the rechargeable battery 49.

The travel condition is not particularly limited to the examples described above, and the usage states of various electrical components other than the air conditioner and headlights may be used as travel conditions. Furthermore, the weather condition is not particularly limited to rainfall and snowfall; cloudy conditions may also be used as travel conditions. Various times and the seasons may also be used as travel conditions. For example, the difference in the road surface temperature due to the time or season may lead to variations in the friction coefficient of the road surface, which may result in fluctuations of the transmission shaft energy value.

The method for determining the travel condition when using the energy learning database 30e is not particularly limited to the method described above. For example, expected changes in the host vehicle's weight may be determined based on the user's driving history or input, or the expected usage of electrical components may be determined. According to such configurations, the energy usage corresponding to expected fluctuations in the travel condition of each road section can be determined. In addition to determining the travel condition based on the category, the travel condition, e.g., the host vehicle's weight when traveling the road section, the usage status of the electrical component in the host vehicle when traveling the road section, and the weather condition when the host vehicle travels the road section, may be directly specified based on a weight value of the host vehicle, an electric power consumption value of the electrical component, rainfall, or the like.

The categories describe above may be constituted so as to dynamically change. For example, the division of categories is considered excessive if the difference in the energy required for traveling the road section for travel conditions belonging to different categories is equal to or less than a predetermined standard. When excessive division of categories is judged, combining two categories enables adjustment of the number of categories so that a significant number of categories can be achieved over the course of learning even if the travel conditions are classified based on an excessive division at the start of learning. Obviously, the number of categories may also be increased over the course of learning. For example, if two or more peaks appear in a distribution (histogram) of the energy required for traveling the road section in a certain category, the category may be divided into two or more categories to more precisely classify the travel condition. It should be noted that when increasing the number of categories based on the energy distribution, suitable categories may be easily defined with the use of an analysis method such as discriminant analysis.

What is claimed is:

1. A travel energy learning device for a host vehicle having a transmission shaft, a motor for driving the transmission shaft to transmit a driving force from the motor to a wheel and a rechargeable battery for powering the motor, a revolution sensor which detects rotary speed of the transmission shaft and a torque sensor which detects torque output by the transmission shaft, the energy learning device comprising:

a road section identifying unit that identifies a road section on which the host vehicle is currently located;

a travel condition information obtaining unit that obtains travel condition information that indicates a travel condition when the host vehicle has traveled the road section;

a work rate deriving unit that derives information that indicates a work rate of the transmission shaft based on a signal from the revolution sensor and on a signal from the torque sensor; and an energy information accumulating unit that:

derives energy information that indicates the energy required for traveling the road section based on the derived information that indicates the work rate of the transmission shaft during traveling of the host vehicle through the road section, wherein the derived energy information includes energy output information indicating the energy output by the transmission shaft and energy efficiency information indicating a ratio of the energy output by the transmission shaft to energy output from the rechargeable battery;

links the derived energy information that indicates the energy required for traveling the road section to the road section and to the travel condition information; and accumulates the information that indicates the energy required for traveling the road section.

2. The travel energy learning device according to claim 1, wherein
   the travel condition information obtaining unit determines whether the travel condition belongs to any one of a plurality of categories set in advance, and obtains information that indicates the category to which the travel condition belongs as the travel condition information.

3. The travel energy learning device according to claim 2, wherein
   the category is predetermined in accordance with a magnitude of electric power consumption of an electrical component in the host vehicle, and the travel condition information obtaining unit obtains a usage state of the electrical component in the host vehicle when traveling the road section, and obtains information that indicates the category to which the electric power consumption in the obtained usage state belongs as the travel condition information.

4. The travel energy learning device according to claim 2, wherein
the category is predetermined in accordance with the size of a weight of the host vehicle, and
the travel condition information obtaining unit obtains the weight of the host vehicle when traveling the road section, and obtains information that indicates the category to which the obtained weight belongs as the travel condition information.

5. The travel energy learning device according to claim 3, wherein
the category is predetermined in accordance with the size of a weight of the host vehicle, and
the travel condition information obtaining unit obtains the weight of the host vehicle when traveling the road section, and obtains information that indicates the category to which the obtained weight belongs as the travel condition information.

6. The travel energy learning device according to claim 2, wherein
the category is predetermined in accordance with a weather condition, and
the travel condition information obtaining unit obtains the weather condition when the host vehicle travels the road section, and obtains information that indicates the category to which the obtained weather condition belongs as the travel condition information.

7. The travel energy learning device according to claim 3, wherein
the category is predetermined in accordance with a weather condition, and
the travel condition information obtaining unit obtains the weather condition when the host vehicle travels the road section, and obtains information that indicates the category to which the obtained weather condition belongs as the travel condition information.

8. The travel energy learning device according to claim 2, wherein
the travel condition information obtaining unit combines two categories into one category if a difference in the energy required for traveling the road section for travel conditions belonging to different categories is equal to or less than a predetermined standard.

9. The travel energy learning device according to claim 3, wherein
the travel condition information obtaining unit combines two categories into one category if a difference in the energy required for traveling the road section for travel conditions belonging to different categories is equal to or less than a predetermined standard.

10. A travel energy learning device according to claim 1, wherein the host vehicle is a hybrid vehicle further having an engine and wherein the travel energy learning device further comprises:
a drive control unit which controls operation of one or both of the motor and the engine in accordance with the accumulated energy information that indicates the energy required for traveling the road section and state of charge of the rechargeable battery.

11. A travel energy learning device according to claim 1, wherein the travel condition information comprises information indicative of at least one of weight of the host vehicle when traveling the road section, a usage status of an electrical component when traveling the road section, and a weather condition when traveling the road section.

12. A travel energy learning method for a host vehicle having a transmission shaft, a motor for driving the transmission shaft to transmit a driving force from the motor to a wheel and a rechargeable battery for powering the motor, a revolution sensor which detects rotary speed of the transmission shaft and a torque sensor which detects torque output by the transmission shaft, the travel energy learning method comprising:
identifying a road section where on which the host vehicle is currently located;
obtaining travel condition information that indicates a travel condition when the host vehicle has traveled the road section;
deriving information that indicates a work rate of the transmission shaft based on a signal from the revolution sensor and on a signal from the torque sensor; and
deriving energy information that indicates the energy required for traveling the road section based on the derived information that indicates the work rate of the transmission shaft during traveling of the host vehicle through the road section, linking the calculated information that indicates the energy required for traveling the road section to the road section and to the travel condition information, and accumulating the energy information that indicates the energy required for traveling the road section; wherein the derived energy information includes energy output information indicating the energy output by the transmission shaft and energy efficiency information indicating a ratio of the energy output by the transmission shaft to energy output from the rechargeable battery.

13. A travel energy learning method according to claim 12, wherein the host vehicle is a hybrid vehicle further having an engine and wherein the travel energy learning method further comprises:
controlling operation of one or both of the motor and the engine in accordance with the accumulated energy information that indicates the energy required for traveling the road section and state of charge of the rechargeable battery.

14. A travel energy learning method according to claim 12, wherein the travel condition information comprises information indicative of at least one of weight of the host vehicle when traveling the road section, a usage status of an electrical component when traveling the road section, and a weather condition when traveling the road section.

15. A non-transitory computer-readable storage medium having, encoded thereon, a travel energy learning program which, when executed by a computer, causes the computer to execute the following steps:
identifying a road section on which a host vehicle is currently located, wherein the host vehicle has a transmission shaft, a motor for driving the transmission shaft to transmit a driving force from the motor to a wheel and a rechargeable battery for powering the motor, a revolution sensor which detects rotary speed of the transmission shaft and a torque sensor which detects torque output by the transmission shaft;
obtaining travel condition information that indicates a travel condition when the host vehicle has traveled the road section;

deriving information that indicates a work rate of the transmission shaft based on a signal from the revolution sensor and on a signal from the torque sensor; and deriving energy information that indicates the energy required for traveling the road section based on the derived information that indicates the work rate of the transmission shaft during traveling of the host vehicle through the road section, wherein the derived energy information includes energy output information indicating the energy output by the transmission shaft and energy efficiency information indicating a ratio of the energy output by the transmission shaft to energy output from the rechargeable battery;

linking the calculated information that indicates the energy required for traveling the road section to the road section and to the travel condition information; and accumulating the energy information that indicates the energy required for traveling the road section.

16. A non-transitory computer-readable storage medium according to claim 15, wherein the host vehicle is a hybrid vehicle further having an engine and wherein the travel energy learning program, when executed by the computer, causes the computer to execute the following additional step:

controlling operation of one or both of the motor and the engine in accordance with the accumulated energy information that indicates the energy required for traveling the road section and state of charge of the rechargeable battery.

17. A non-transitory computer-readable storage medium according to claim 15, wherein the travel condition information comprises information indicative of at least one of weight of the host vehicle when traveling the road section, a usage status of an electrical component when traveling the road section, and a weather condition when traveling the road section.

* * * * *